Jan. 12, 1937.  C. S. LAWTON ET AL  2,067,717
PLOUGH FOR LAYING SUBMARINE CABLES
Filed Feb. 12, 1935  6 Sheets-Sheet 1

INVENTORS
CHESTER S. LAWTON
BY  MELVILLE H. BLOOMER
Eugene C. Brown
ATTORNEY

Jan. 12, 1937.  C. S. LAWTON ET AL  2,067,717
PLOUGH FOR LAYING SUBMARINE CABLES
Filed Feb. 12, 1935  6 Sheets-Sheet 2

INVENTORS
CHESTER S. LAWTON
BY MELVILLE H. COOMER

Eugene C. Brown
ATTORNEY

Jan. 12, 1937.  C. S. LAWTON ET AL  2,067,717
PLOUGH FOR LAYING SUBMARINE CABLES
Filed Feb. 12, 1935  6 Sheets-Sheet 3

INVENTORS
CHESTER S. LAWTON
BY  MELVILLE H. BLOOMER
Eugene C. Brown
ATTORNEY

Jan. 12, 1937.                C. S. LAWTON ET AL                 2,067,717
                          PLOUGH FOR LAYING SUBMARINE CABLES
                              Filed Feb. 12, 1935          6 Sheets-Sheet 4

INVENTORS
CHESTER S. LAWTON
BY  MELVILLE H. BLOOMER

Eugene C. Brown
ATTORNEY

Jan. 12, 1937.  C. S. LAWTON ET AL  2,067,717
PLOUGH FOR LAYING SUBMARINE CABLES
Filed Feb. 12, 1935  6 Sheets-Sheet 5

INVENTORS
CHESTER S. LAWTON
BY MELVILLE H. BLOOMER
Eugene C. Brown
ATTORNEY

Patented Jan. 12, 1937

2,067,717

UNITED STATES PATENT OFFICE 2,067,717

PLOUGH FOR LAYING SUBMARINE CABLES

Chester S. Lawton, Ridgewood, N. J., and Melville H. Bloomer, Halifax, Nova Scotia, Canada, assignors to The Western Union Telegraph Company, New York, N. Y., a corporation of New York Application February 12, 1935, Serial No. 6,180
In Great Britain November 16, 1934

20 Claims. (Cl. 61—72)

The invention relates to a novel method of, and apparatus for, laying a submarine cable in a trench of predetermined depth in the bed of the ocean or other body of deep water.

Heretofore submarine cables have been laid on the bottom of the ocean, river or other body of water which they span, in place of being buried therein, because of what were regarded as insurmountable obstacles to digging a cable trench in the bed of the body of water, and because if it were thought possible to dig such a trench there was no practical way known to insure that the cable would be placed in the trench. Also, a trench dug in the bed of a body of water will rapidly fill in because of the silt deposit and washing action of the water, so that any trench so dug would be partially or substantially entirely filled before the cable could be laid in it. It frequently happens that a cable laid on the bottom, as is customary, is fouled or dragged and sometimes broken, by otter boards of nets of fishing vessels or by ships' anchors when dragging or when weighing anchor. The necessary repairs are costly, and service is usually interrupted for a considerable length of time.

One object of the invention is to obviate the foregoing disadvantages, and to minimize the possibility of fouling or injuring the cable; more particularly, a trench of predetermined depth is ploughed in the bottom or bed of the body of water and the cable simultaneously payed out and forcibly placed in the bottom of the trench in such manner that there is a gradual transition in the direction of the cable as it enters the plough and is laid in the trench, so that the cable is embedded in the bed of the body of water and is not subject to fouling or injury by ships' anchors or other objects on the bottom.

Another object of the invention is a practical method of embedding a submarine cable in the bed of a body of water, which method enables a cable to be speedily laid without injury to the cable, and at a cost comparable to that of the practice heretofore employed of laying a cable on the bed of a body of water.

Another object of the invention is to provide a novel and improved form of apparatus for ploughing a trench of predetermined depth in the ground and simultaneously placing therein a cable, which apparatus is suitable for laying submarine cable in deep water, and at any desired distance from shore.

Another object of the invention is to provide apparatus of the foregoing character which is especially adapted for working under water, and therefore is particularly suitable for laying submarine cables.

The invention further resides in the features of combination, construction, and arrangement hereinafter described and claimed.

For an understanding of the invention, and for illustration of some of the various forms it may take, reference is to be had to the accompanying drawings, in which.

Figure 7:
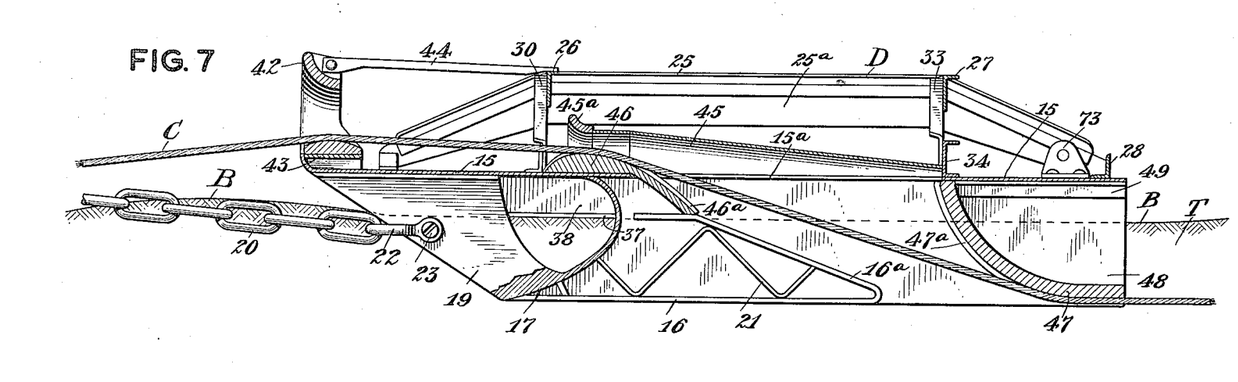
Figure 7 is a longitudinal sectional view of the cable embedding device in operation, the section being taken along the line 7—7 of Figure 1.

Referring particularly to Figures 1 to 4 and 7, there is shown one form of cable embedding device D for ploughing a cable trench T, Figure 7, and simultaneously placing therein a cable C. The device comprises a frame member or plate 15, the plate being made from iron, steel, brass, or other suitable material, preferably material resistant to the corrosive action of salt water. Integrally secured to the frame 15 in any suitable manner, as by welding or riveting, and depending therefrom is a plough 16 of wrought or cast steel, or other suitable material, having on the front end thereof a double ploughshare 17, adapted to plough a cable trench of predetermined depth in the bed of the body of water in which the cable is to lie. Preferably, and as shown, the ploughshare has wing members 18 on either side thereof to facilitate displacing the material forming the ocean bed sufficiently to allow the cable to be deposited in the bottom of the resulting trench. The plough may be strengthened, as by a centrally disposed web 19 connecting the ploughshare with the plates 15, the web also conveniently serving as a means to which a towline 20, Figures 5 to 7, may be secured in any suitable manner, as by a shackle 22, Figure 5, to the web 19, for example, the shackle pin 23 passing through a hole 24, Figure 2, in the web. An important function of the web 19 is to prevent fouling of the ploughshare 17 by obstructions, such as underlying rock formations, coral formations and the like, which may be encountered in the ocean bed, the inclined forward portion of which web engages any such obstruction in advance of the ploughshare and causes the latter to be lifted up over the obstruction. After the obstruction has been passed, the device immediately begins again to plough the cable trench and continues with the embedding operation of the cable, and thus operations need not be suspended because of any obstruction encountered.

Figures 7A, 8:
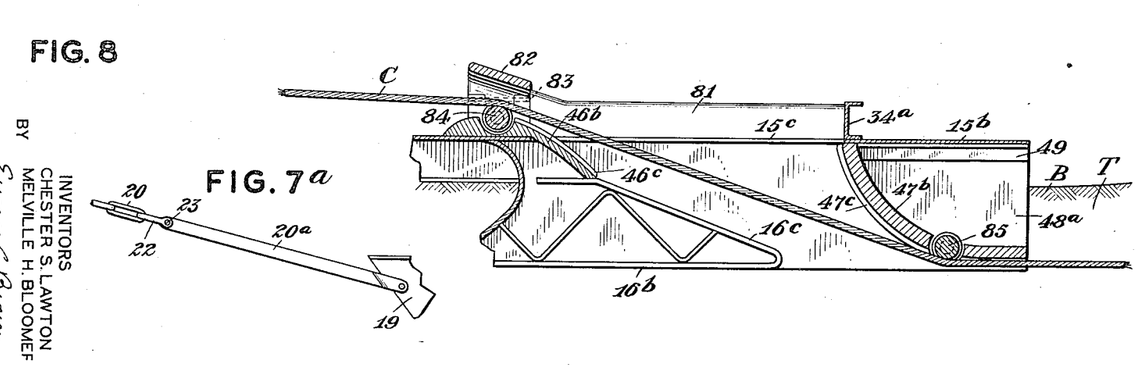
Figure 7a shows details of a draw bar device for connecting a towing chain to the cable embedding device.
Figure 8 is a partial longitudinal sectional view, taken in the manner of Figure 7, showing a modified form of device.

If desired a draw bar 20a, Figure 7a, of small lateral dimension may be interposed between the web 19 and the towing chain 20 to facilitate cutting through the ocean bed. The draw bar is preferably offset or forked adjacent the web 19 so as to pull in the same plane as the web 19.

The plate 15 is provided with wing guards consisting of longitudinally extending angle members 25, 25, these members being cross braced by transverse angle members 26, 27 and 28. The guards 25 are secured to the plate 15 at one of their ends 29, in any suitable manner, as by welding or riveting, and at their other ends are secured to the plate 15 by means of the transverse angle 28. Transverse brace 26 is secured to plate 15 by means of brackets 30 and angles 32, and the brace 27 is secured to plate 15 by brackets 33 and angles 34. Tie pieces 35, 35 are also provided to connect the plate 15 at the forward edge thereof to the longitudinally extending runners 37, 37, on either side of the plate 15, and depending therefrom. These runners or skid members 37 slope upwardly at 37a to facilitate sliding of the device over obstacles and irregular surfaces. The runners 37 are the means by which the cable embedding device D is slid along on the bottom B of the ocean or other body of water, the skid members coacting with the plough 16 to determine the depth of the cable trench. Preferably, and as shown, the runners or skid members are secured to the plate 15 by means of channel bars 38, 38, Figures 2 and 4, the channel bars also providing stiffening means for the runners.

Secured to the upper side of plate 15 is a cable guide ring 42, preferably having the form of a bell mouth, Figure 7, to permit the cable C easily to enter the guide and to reduce the friction as the cable passes therethrough, and to minimize possibility of injury to the cable. The guide may be secured to plate 15 in any suitable manner, as by a mounting piece 43 riveted to the plate, and the guide preferably is braced, as by a rod 44 having one end secured to the guide and its other end secured to the transverse brace member 26, the rod also providing a guard means to prevent fouling of the device. Disposed rearwardly of the forward cable guide 42, and secured to the plate 15, is a tubular member 45 having at its forward end a flared mouth 45a to facilitate passage of the cable therethrough, the mouth 45a being secured, as by a flanged portion 45b, Figure 1, to the plate 15. A curved guide member or shoe 46, secured to a plate 15, has a grooved portion 46a in which the cable C travels as it is payed out.

The under side of the tubular member 45 is open and is in register with a slotted portion 15a of plate 15, Figure 7, so that free passage is afforded the cable from the tube 45 through the opening 15a, the cable passing downwardly between a sloping surface 16a of the plough and a rear guide member 47 which depends from the plate 15 a distance such that it extends substantially to the bottom of the cable trench, thereby to cause the cable to be laid on the bottom of the trench in the manner shown. The guide 47 may be strengthened by a web 48 extending between the guide member and the plate 15, and the guide and web are secured to the plate 15 in any desired manner, as by angle pieces 49, 49. The guide 47 also has a grooved portion 47a which receives and guides the cable into the center and lowermost part of the trench T. Preferably, and as shown, the opening in the guide member 45a is smaller than the cross sectional area of the passageway behind the plough, so that any debris or material which passes through member 45a will not foul or clog the passageway.

Figures 5, 6:
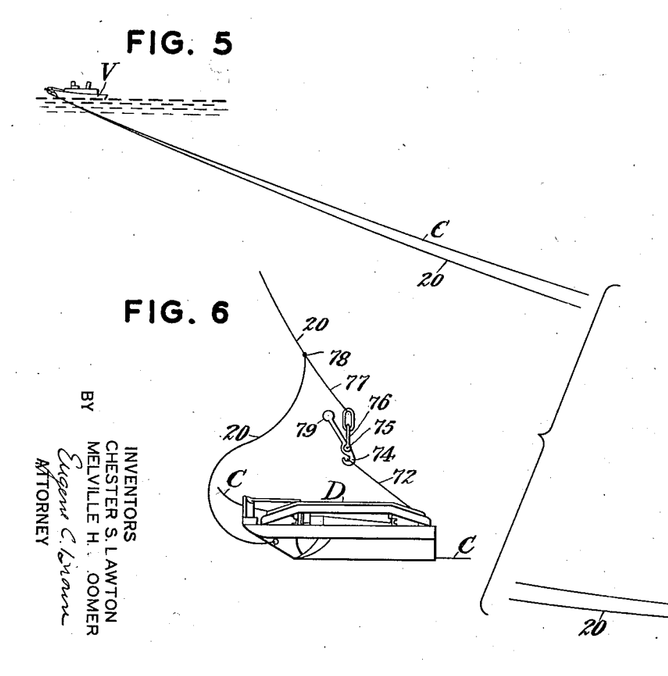
Figure 5 is a diagrammatic view of a cable ship and the cable embedding device in operation while laying a cable in a trench at the bottom of the ocean or other body of water.
Figure 6 shows a device suitable for lowering the cable embedding device in operative position on the bottom of the ocean.

When laying a submarine cable, as will be seen from Figure 5, the cable embedding device D is towed by a cable ship or vessel V, by means of the towline 20, and the cable C is payed out from the vessel, both the cable and towline forming long curves in the water approximating one-half of a catenary. By employing a towline of proper length, as may readily be determined empirically or by calculation, the sag in the line will cause the line to pull on the cable embedding device in a direction substantially parallel to the bed over which the device is traveling, and thus keep the plough 16 at the proper depth in the bed. Preferably the sag on the cable is maintained such that the cable is tangent to the bed substantially at the point where it enters the device D, or at some distance ahead of the device, as indicated in Fig. 5.

Figure 9:
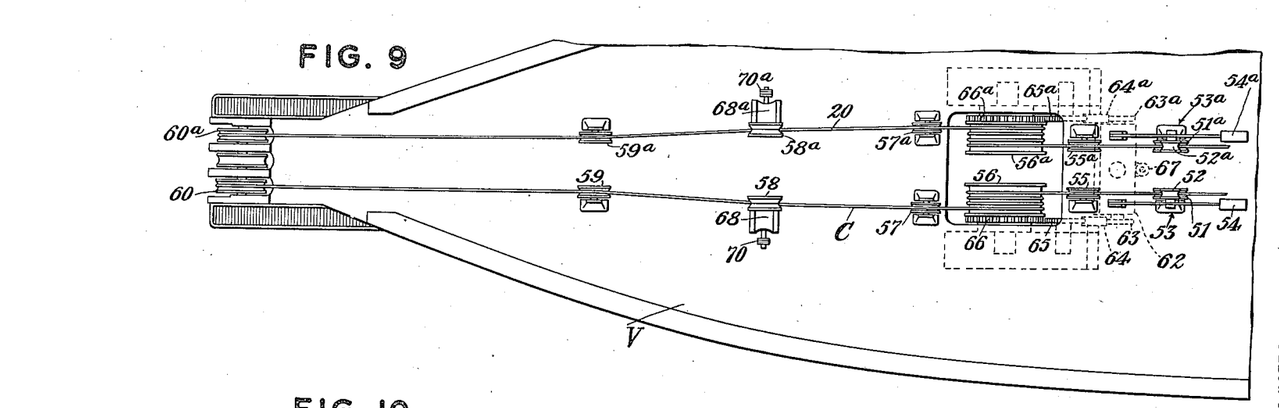
Figures 9 and 10 are diagrammatic views in top plan and side elevation, respectively, of the cable ship, showing certain cable and towline paying out and control means employed in practicing the invention.
Figure 10:
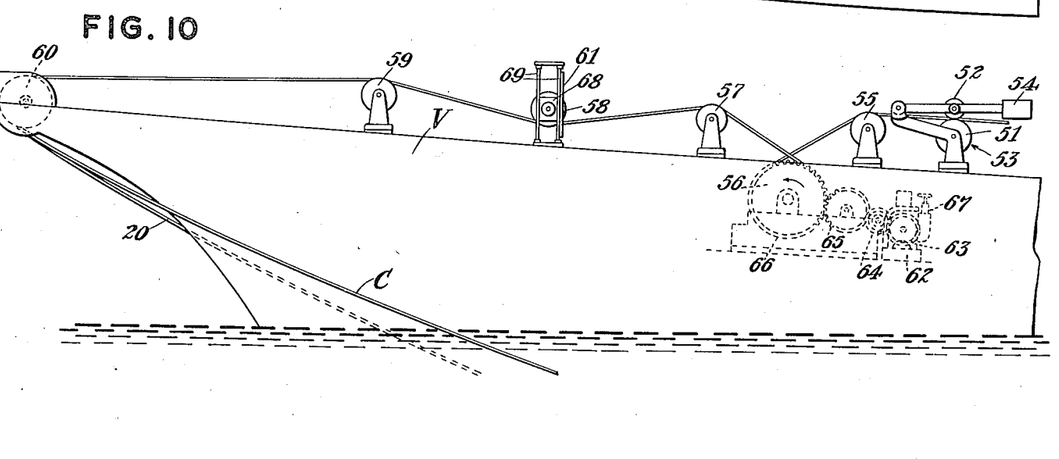

Referring to Figures 9 and 10 of the drawings, there is shown the bow of the cable ship V from which the cable C is payed out. Coming from a cable supply in the hold of the ship (not shown) the cable C passes between rollers or sheaves 51 and 52 of a brake device 53 which, by means of a weight 54 bearing on roller 52, controls the slack condition of the cable as it passes to the cable payout drum 56. The cable winds around the drum 56 several times and then passes on rollers or sheaves 57, 58, 59, and 60 to the bow of the ship where it is payed out to the cable embedding device in the manner shown in Figure 5.

The cable payout drum is rotated at the proper speed, in the direction indicated by the arrow in Figure 10, by any suitable source of power, such as a steam engine 62, connected to drum 56 by a train of driving gears 63 to 66, the rate at which the drum 56 is driven being controlled by means of a control valve 67 on engine 62.

Sheave 58, under which the cable C passes as it is payed out, is carried by a block 68 which is slidably mounted and vertically reciprocal in guide members 69, the block 68 and roller 58 being urged downwardly by means of weights 70. These members, in combination with supporting sheaves 57 and 59, comprise a dynamometer for measuring the tensile stress on the cable as the latter is payed out. When the tensile stress on the cable increases the roller 58 and block 68 are moved upwardly, against the action of weights 70, thus giving notice to the engineer or operator of the increase in stress; when the roller and block move downwardly this indicates a decrease in tension on the cable. A scale 61 indicates the amount of tensile stress on the cable, so that the operator or engineer may vary the speed of the engine 62, or brake the payout drum 56, according to the conditions, and thus the tensile stress on the cable may be maintained within predetermined limits, thereby maintaining the desired line of approach of the cable as it passes to the embedding device, and preventing overstrain on the cable.

The stress on the towline 20 may be measured and controlled in the manner above stated by a similar dynamometer device comprising sheaves 57a to 59a and a slide block 58a. The towline 20 passes from the hold over an arrangement of control devices 51a to 70a similar to that provided for the cable, thus enabling the length of the towline between the bow of the vessel and the cable embedding device D to be adjusted to varying depths of water and conditions of towing and to permit the tension on the towline to be maintained between predetermined limits. The operator controlling drum 56a manipulates the steam valve or other control to the engine geared to the drum in such manner as to pay out or pick up the towline as occasion demands. The foregoing arrangement also obviates danger of breakage or injury to the towline should the cable embedding device become fouled by a rock, ledge or other obstruction in the ocean bed.

Referring again to Figure 7, it will be seen that the cable C is deflected downwardly by the guide members 46 and 47 and is caused to be laid into the trench T immediately behind the plough 16, so there is no danger that material displaced by the plough will slide or be washed back into the trench before the cable is laid therein. After the cable is laid the trench generally will fill rapidly, due to silt deposits and the washing effect of the water, so that the cable becomes covered with the displaced material without the necessity of back filling and in time is firmly embedded in the bed or bottom of the body of water. The trench may be dug to any desired depth and the cable laid therein, depending upon the particular conditions which obtain.

When laying cable in water of any considerable depth it is generally essential that armored cable be used owing to the necessity of imparting to the cable sufficient tensile strength to withstand its own weight in suspension as well as the friction in passing through the cable embedding device. Therefore, if the cable is caused to make acute bends or angles either where it enters or as it is passed through the embedding device, this will kink the cable and prevent its being properly laid in the trench, or if laid in the trench, the armor wires of the cable would develop a permanent set tending to produce kinks which would prevent it from lying flat in the trench and cause portions of it to extend out of the trench. Also, making any acute bend or angle in the cable tends to cause electrical damage as well as mechanical damage. As shown in Fig. 7, the cable is caused to pass through the device from the forward to the after end thereof, and is positively guided in its course by the respective guide members 42, 46, and 47 shown. Due to the appreciable length of the plough and the fact that the cable enters at the extreme forward end and leaves at the extreme after end, there is a gradual transition in the direction of the cable as it enters the plough and is laid into the trench. Elimination of short bends in the cable as it passes through the embedding device also materially reduces the friction or pull of the plough on the cable and thus tends to prevent abrasion and rupture of the cable or the introduction of severe strains in the cable. It also appreciably reduces the towline pull necessarily exerted by the ship while the cable is being laid. The angles of deflection of the cable will, of course, vary within certain limits depending upon the depth of the cable trench, the length of the plough, the size of the cable, etc. In the modification shown in Fig. 7, the cable guide elements are so positioned that as the cable enters the device it is approximately tangent to the bed B, and as the cable passes through the device it is deflected through angles (by the guides 46 and 47) each not greater than fifteen to seventeen degrees. In the modification shown in Fig. 11, hereinafter discussed in detail, the cable is deflected through angles (by the guides 108, 109, and 111) none of which is greater than twenty-one degrees. Preferably, the cable is never deflected through an angle greater than thirty degrees as it passes through the embedding device, although if guide elements having suitably large radii are employed, it is conceivable that the cable might safely be deflected through angles up to sixty degrees.

The primary function of the fins 31 at the base of the plough is to cause the rear of the embedding device to dig into the full depth of the ploughshare against the tension of the cable passing through the device.

Figure 1:
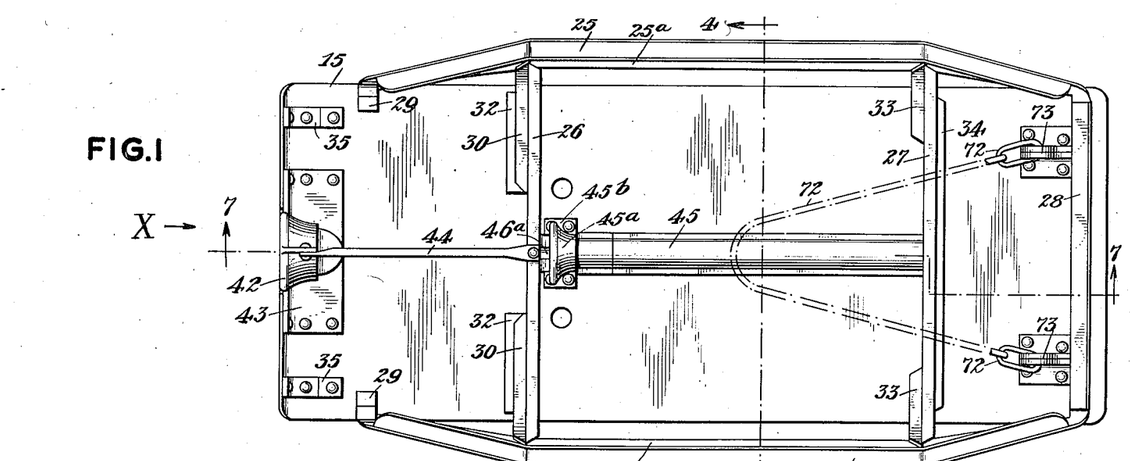
Figure 1 is a top plan view of one form of a cable laying and embedding device in accordance with the invention.
Figure 2:
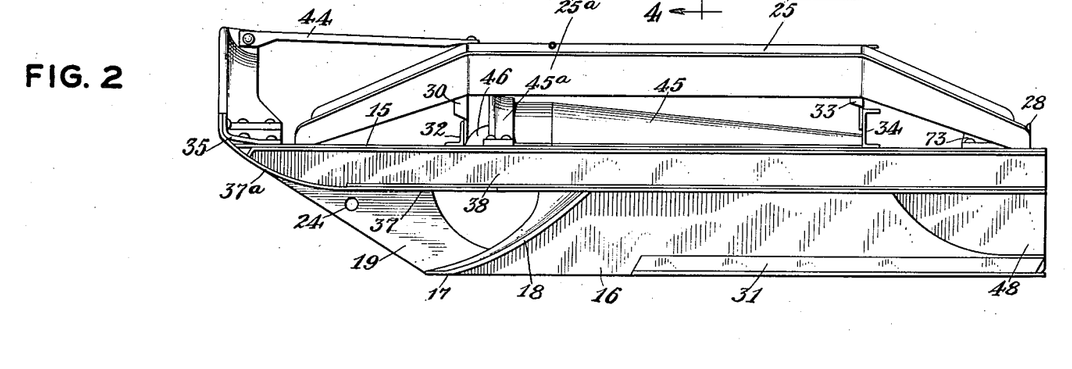
Figure 2 is a side view, in elevation, of the device of Figure 1.
Figures 3, 4:
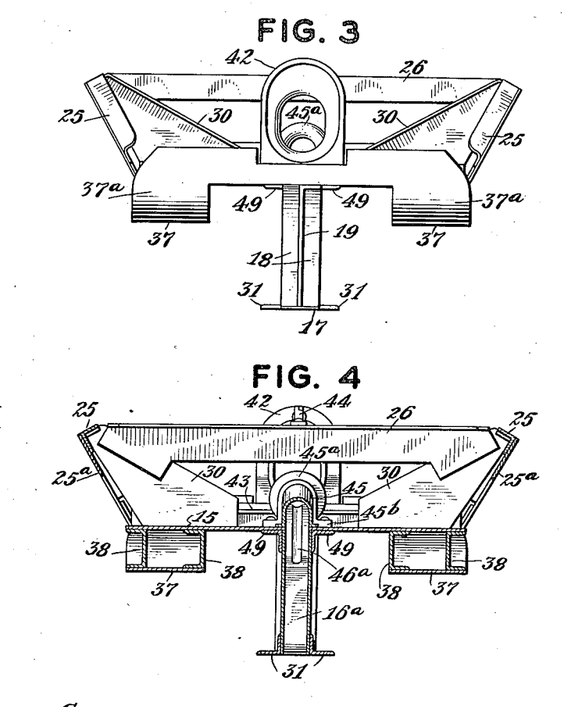
Figure 3 is a view, in elevation, of the front end of the device, looking in the direction of the arrow X in Figure 1.
Figure 4 is a cross sectional view taken along the line 4—4 of Figure 1, looking in the direction of the arrows.

Referring to Figures 3 and 4, it will be noted that the longitudinally extending angle members 25 and plates 25a are inclined outwardly at a substantial angle to the horizontal, so that when the cable embedding device is canted sidewise from the horizontal, due to the uneven bed or ground conditions or during lowering operations, the members 25, 25a prevent the device from turning over. The angle at which the members 25, 25a make to the horizontal may be varied, and any desired configuration other than that shown may be employed, depending upon conditions encountered in the particular service for which the device is to be used. In the form shown, the inclination of the members 25, 25a is such that the device will not turn over even though canted to 125° to the horizontal.

The general shape or configuration of the device likewise may be varied, depending upon the service for which the device is to be used; for example, the front of the device may be rounded or tapered to prevent fouling rocks or other obstacles and to prevent the ooze, earth, or debris from accumulating at the front end.

It will be noted that no scraper or other means is provided at the rear of the device to scrape or turn back the material displaced by the plough;

because of the washing action of the water, and the deposit of silt hereinbefore referred to, it will generally be found unnecessary to provide means for throwing back the removed material to back fill the trench. Such scraper means may, in fact, prove disadvantageous in that it may have a tendency to raise the rear end of the plough up out of the cable trench and thus reduce the depth of the trench to less than the desired depth.

Figure 6 illustrates a convenient method of lowering the cable embedding device in position on the bed of the ocean or other body of water. As will be seen in Figure 1, there are provided two eyes 73, 73 to which a loop or bridle 72 is secured. As shown in Figure 6, there is provided a releasable hook 74 pivotedly connected at 75 to a short chain length 77 which is connected at 78 to the towline 20, and thus the towline may be employed for lowering the device into position. The other end of hook 74 has a weight 79 thereon, and when the device D is resting on the bed of the body of water, slack in the towline 20 will cause the hook 74 to be further lowered, at which time the weight 79 will turn the hook in a counterclockwise direction, as viewed in Figure 6, so that the hook is released from the bridle 72, after which the towline 20 pulls straight from the front of the cable embedding device. It will be understood that due to the weight of the device D, the shape of the plough, and the direction of pull of the towline, the plough will immediately start to dig.

Figure 8 shows a modified form of device, in which two V-shaped plates (only one of which is seen in the figure) receive and guide the cable C through an opening 15c in the plate or frame member 15b. As shown, the cable guide member 82 is in the form of a split sleeve with tapered halves pivotedly joined at 83. Also, the cable deflecting members include rollers 84 and 85, mounted at each end thereof in the framework, and freely revolvable thereby to minimize frictional effects.

Figure 11:
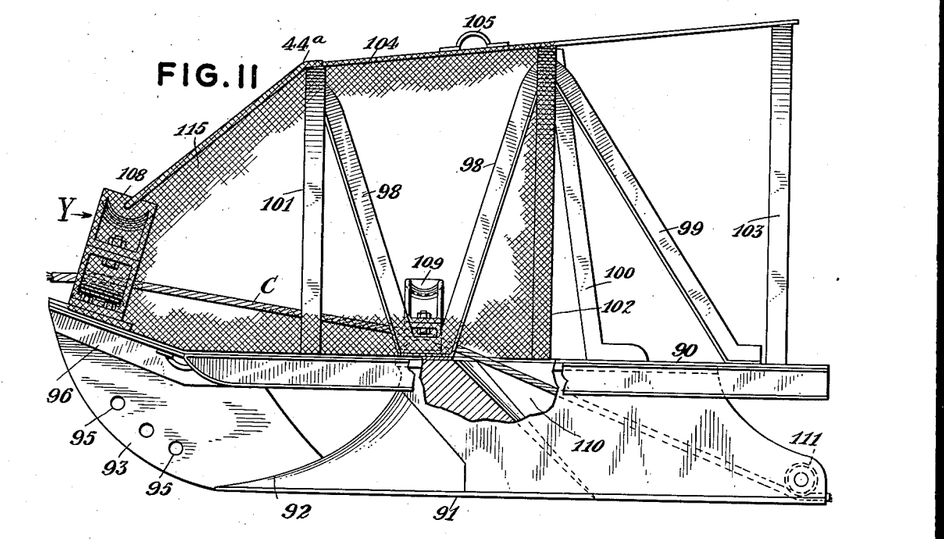
Figure 11 is a side view, in elevation, of another form of the invention.
Figure 12:
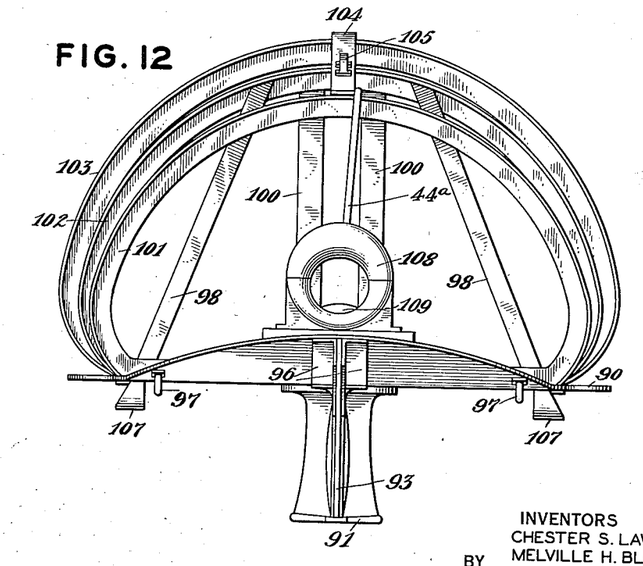
Figure 12 is a front view, looking in the direction of the arrow Y in Figure 11, with certain parts omitted for the sake of clearness.
Figure 13:
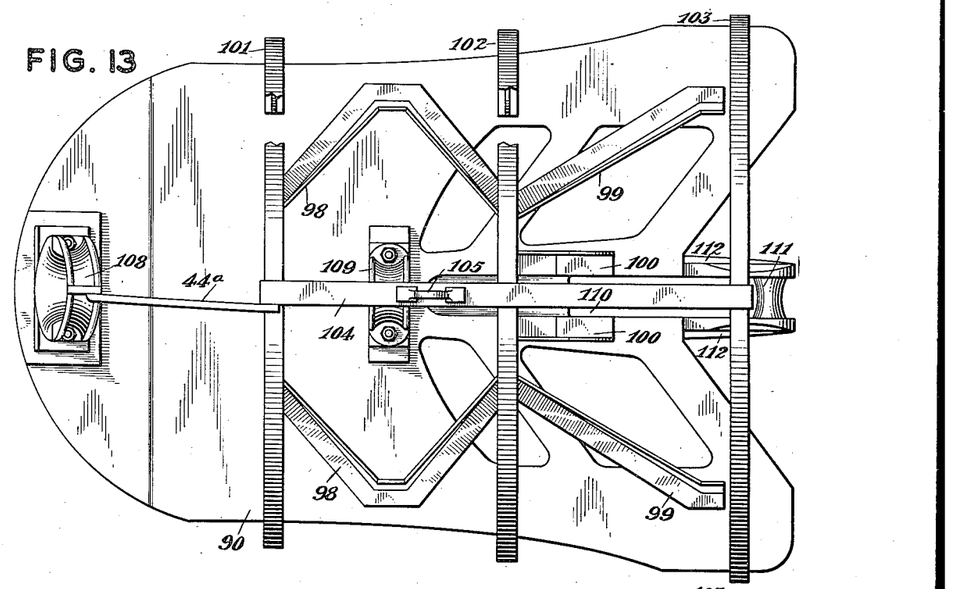
Figures 13 and 14 are top and bottom views respectively, of the device of Figure 12.
Figure 14:
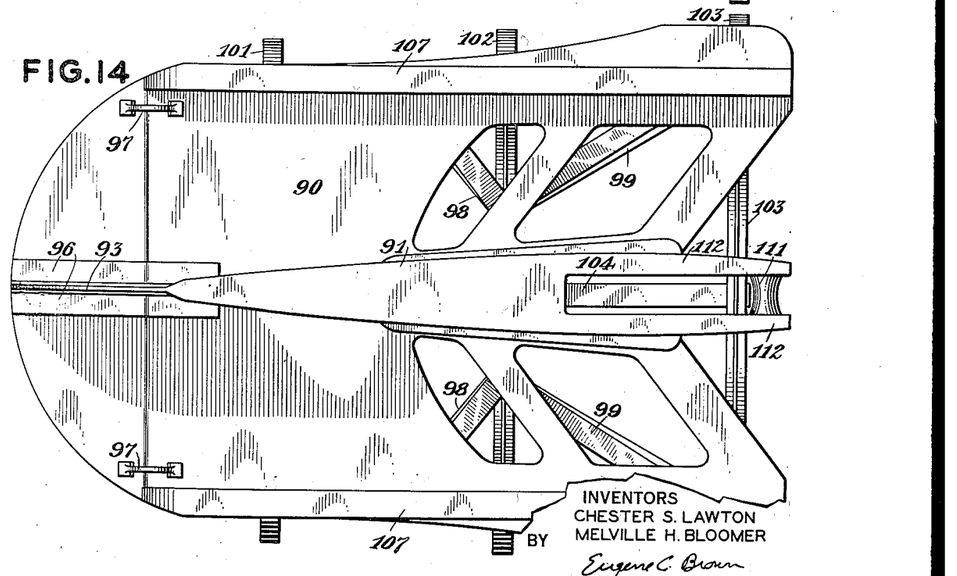

Figures 11 to 13 show a further modification of the cable embedding device. In this form, a plate or frame member 90 has depending therefrom a plow 91, Figures 11 and 12, carrying a ploughshare 92 of desired configuration, the ploughshare being connected by a web 93 to the plate 90. The web 93 may have holes 95 therein to facilitate connection of the towline, if desired, or the towline may be connected to pad eyes 97, 97 secured to the forward end of plates 90 in any suitable manner, as by welding.

Plate 90 is structurally braced by longitudinally extending angle members 96, 96, and is further braced by angle members 98 to 103, also by a longitudinally extending strap brace 104. An eye member 105 secured to brace 104 provides a convenient lifting means for engagement by a hook 74, Figure 6, of the line for lowering the device in operative position.

Braces 101, 102, and 103 are in the form of hoops, and function to prevent the device from turning over when it is canted sidewise from the horizontal, the hoop shaped members also causing the device to tend to right itself if turned over. A pair of runners 107, 107, depending from the frame member 90, function in the manner of the runners 37 of the first described form of cable embedding device.

The cable C passes through cable guides 108 and 109, as shown in Figure 11, each of these guides, in the specific embodiment illustrated, having the form of split rings secured to the plate 90, the cable passing downwardly through an opening 110 in plate 90, and under a roller 111 mounted in lugs 112 extending from the plough 91. As shown in Figure 11, the front part of the device preferably is enclosed by a heavy mesh screen 115 secured, as by spot welding, to the plate and brace members.

The web portion 93 extending between the ploughshare and the frame provides means for causing the ploughshare to ride over rocks or other obstacles encountered in its travel through the ocean bed or ground, and thus prevent fouling of the ploughshare.

In the illustrative form shown, the cable is payed out from the same vessel that does the towing, but it is to be understood that one vessel may be employed for towing and a second vessel employed to carry and pay out the cable, the respective speeds and movements of the vessels being coordinated.

As hereinbefore stated, the cable embedding device of the invention is particularly suitable for submarine work, but is also well adapted for embedding underground cables on shore or land, and particularly in soft or marshy land where trench-digging and cable-laying devices of the types heretofore employed are unsuitable. The device provides an integral unit which is rugged and simple in construction, and which may readily be transported to any desired place. Because it is relatively small in size, the device may be used in places which hitherto have been inaccessible to the trench-digging and cable-laying devices of conventional types.

While there are shown and described herein certain preferred embodiments of the invention, many other and varied forms and uses will present themselves to those versed in the art without departing from the invention, and the invention is, therefore, not limited either in structure or in use except as indicated by the terms and scope of the appended claims.

We claim:

1. Apparatus for embedding submarine cable comprising a cable embedding device for forming under water a trench in the bed of the body of water in which the cable is to lie, and means for lowering said embedding device onto said bed comprising a flexible line having a device secured thereto for releasably engaging said cable embedding device to enable the same to be suspended and lowered from a vessel in substantially upright position onto the bed of the body of water.

2. Apparatus for embedding submarine cable comprising a cable embedding device for forming under water a trench in the bed of the body of water in which the cable is to lie, and means for lowering said embedding device onto said bed comprising a flexible line having a device secured thereto for releasably engaging said cable embedding device to enable the same to be suspended and lowered from a vessel in substantially upright position onto the bed of the body of water, said engaging device having means operable from the vessel to release the engaging device after the embedding device is in position on said bed.

3. Apparatus for embedding submarine cable comprising a cable embedding device for forming under water a trench in the bed of the body of water in which the cable is to lie, and means for lowering said embedding device onto said bed comprising a flexible line having a device secured thereto for releasably engaging said cable embedding device to enable the same to be suspended and lowered from a vessel in substantially upright position onto the bed of the body of water, said engaging device having means automatically operable to release the engaging device from the cable embedding device after the embedding device is in position on said bed.

4. Apparatus for embedding submarine cable comprising a cable embedding device for forming under water a trench in the bed of the body of water in which the cable is to lie, and means for lowering said embedding device onto said bed comprising a towline secured to the embedding device, said towline having a device secured thereto for releasably engaging said cable embedding device to enable the same to be suspended and lowered from a vessel in substantially upright position onto the bed of the body of water, said engaging device having means operable from the vessel to release the engaging device, without disengaging the towline from the embedding device, after the embedding device is in position on said bed.

5. Apparatus for laying a submarine cable, comprising a device having a ploughshare for ploughing under water a trench in the bed of the body of water in which the cable is to lie, means including a flexible towline for pulling said device along on the bed of the body of water, said device having cable guide elements for directing the cable through the device from the forward end to the after end thereof, said cable guide elements being so positioned relative to each other that the cable is deflected through angles each not greater than 60 degrees as it passes through the device, said elements including means for forcibly placing the cable in the trench immediately behind said ploughshare.

6. A device for embedding a submarine cable, comprising a ploughshare for ploughing under water a trench in the bed of the body of water in which the cable is to lie, means including a flexible towline for pulling said device along on the bed of the body of water, said device having cable guide elements for directing the cable through the cable embedding device and into the trench immediately behind the ploughshare, said guide elements being so disposed relative to each other as to cause the cable to pass through the device and enter the trench with angles of deflection each not greater than thirty degrees, thereby to prevent the formation of kinks and bends in the cable.

7. A device for embedding submarine cable, comprising a ploughshare for ploughing under water a trench in the bed of the body of water in which the cable is to lie, means including a flexible towline for pulling said device along on the bed of the body of water, said device having supporting skid surfaces for engaging and traveling along on the bed of said body of water, and including cable guide elements for directing the cable through the cable embedding device from the forward end to the after end thereof, said guide elements being so disposed as to prevent the formation of kinks and bends in the cable by causing the cable to pass through the device and enter the trench with angles of deflection each of the order of twenty degrees.

8. A cable plough for laying a submarine cable, comprising a ploughshare for ploughing under water a trench in the bed of the body of water in which the cable is to lie, means including a flexible towline for pulling said plough along on the bed of the body of water, said plough having cable guide elements for directing the cable through the plough from the forward end to the after end thereof, said cable guide elements being displaced laterally and horizontally relative to each other to direct the cable into the plough substantially tangent to the bed and to deflect the cable through reverse angles each not greater than sixty degrees as the cable passes through the plough.

9. A device for embedding a submarine cable, said device comprising a frame member having supporting surfaces for engaging and traveling along on the bed of the body of water in which the cable is to lie, means including a flexible towline for pulling said device along on the bed of the body of water, the device including a ploughshare for plowing a cable trench, means between which the cable passes for preventing any substantial silting or filling in from occurring until after the cable has been laid in the trench, and means for directing the cable through the cable embedding device from the forward to the after end thereof in such manner as to cause the cable to be substantially tangent to the bed at the place where the cable enters the embedding device and to pass through the device and enter the trench with relatively small angles of deflection.

10. A submarine cable embedding device comprising a ploughshare for ploughing a trench in the bed of the body of water in which the cable is to lie, said device having means positioned adjacent to and in advance of the ploughshare for engaging obstructions beneath the surface of said bed and lifting the ploughshare over said obstructions.

11. A cable embedding device comprising a supporting structure through which the cable passes, a ploughshare depending from said structure for forming a cable trench, and means depending from said structure and positioned adjacent to and in advance of said ploughshare for engaging obstructions and causing the ploughshare to be lifted over said obstructions.

12. A submarine cable embedding device having a supporting structure for engaging and traveling along on the bed of the body of water in which the cable is to lie, a ploughshare depending from said structure for ploughing a cable trench, and a member having an inclined forward edge extending between said ploughshare and supporting structure for engaging obstructions in the bed ahead of the ploughshare and causing the ploughshare to be lifted over said obstructions.

13. A submarine cable embedding device having a supporting structure for engaging and traveling along on the bed of the body of water in which the cable is to lie, a ploughshare depending from said structure for ploughing a cable trench, and a member having an inclined forward edge extending between said ploughshare and supporting structure for engaging obstructions in the bed ahead of the ploughshare and causing the ploughshare to be lifted over said obstructions, said member comprising a web connected to the forward end of said ploughshare.

14. A submarine cable embedding device comprising a supporting framework, a ploughshare depending from said framework for ploughing a trench in the bed of the body of water in which the cable is to lie, said device having means positioned in advance of the ploughshare and extending downwardly substantially to the same distance as the ploughshare for engaging obstructions beneath the surface of said bed and lifting the ploughshare over said obstructions.

15. A submarine cable embedding device comprising a supporting structure through which the cable passes, a ploughshare secured to said structure for forming a cable trench in the bed of the body of water in which the cable is to lie, means for engaging obstructions on or extending from the surface of said bed to prevent the supporting structure from being fouled thereby, and other means having an inclined forward portion in advance of said ploughshare for engaging obstructions beneath the surface of said bed and causing the ploughshare to be lifted over said obstructions.

16. A cable embedding device comprising a rectangular supporting framework through which the cable passes, a ploughshare depending from said framework for forming a cable trench, and means in advance of said ploughshare and extending between the ploughshare and framework for engaging obstructions and causing the ploughshare to be lifted over said obstructions.

17. A cable embedding device comprising means for ploughing a trench in the bed in which the cable is to lie, said device having horizontally extending blade means for engaging a side of the cable trench to cause the after end of the embedding device to dig in to substantially the full depth of the trench ploughing means against the tension of the cable passing through the embedding device.

18. A device for embedding a submarine cable comprising a supporting framework, means carried by said framework for ploughing a trench in the bed of the body of water in which the cable is to lie, and structures extending upwardly substantially from the outer edges of the sides of said framework, said side structures being inclined outwardly at a substantial angle to the horizontal and effective to prevent the device from turning over when canted from the horizontal through a large angle.

19. A cable embedding device for laying a submarine cable, said device comprising means for forming under water a trench in the bed of the body of water in which the cable is to lie, and a structure extending upwardly substantially from the outer edges of the sides of the device and over the top of the device, said structure having a contour such that if the embedding device assumes a position on the bed of the body of water other than its normal working position, it will right itself.

20. A device for embedding a submarine cable, said device comprising a frame member having supporting surfaces for engaging and traveling along on the bed of the body of water in which the cable is to lie, means including a flexible towline for pulling said device along on the bed of the body of water, the device including a ploughshare for ploughing a cable trench, means between which the cable passes for preventing any substantial silting or filling in from occurring until after the cable has been laid in the trench, means for directing the cable through the cable embedding device from the forward to the after end thereof in such manner as to cause the cable to be substantially tangent to the bed at the place where the cable enters the embedding device and to pass through the device and enter the trench with relatively small angles of deflection, means for engaging obstructions beneath the surface of said bed to lift the ploughshare over such obstructions, and means on said embedding device for righting the device if it assumes a position on said bed other than its working position.

CHESTER S. LAWTON.
MELVILLE H. BLOOMER.